United States Patent
Kobayashi (10) Patent No.: US 6,853,899 B2
(45) Date of Patent: Feb. 8, 2005

(54) LIGHTING DEVICE FOR VEHICLE

(75) Inventor: Shoji Kobayashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/218,588

(22) Filed: Aug. 15, 2002

(65) Prior Publication Data

US 2003/0045985 A1 Mar. 6, 2003

(30) Foreign Application Priority Data

Sep. 3, 2001 (JP) ..................................... P.2001-265487

(51) Int. Cl.⁷ .......................... B60R 22/00; E05F 15/00; G05D 1/00
(52) U.S. Cl. .......................... 701/49; 701/36; 701/207; 701/208; 701/209; 340/905
(58) Field of Search ........................... 701/49, 36, 207, 701/208, 209; 340/905

(56) References Cited

U.S. PATENT DOCUMENTS

| | | | | |
|---|---|---|---|---|
| 5,247,440 A | * | 9/1993 | Capurka et al. .............. | 701/49 |
| 6,049,749 A | * | 4/2000 | Kobayashi .................... | 701/49 |
| 6,161,065 A | * | 12/2000 | Kamishima et al. .......... | 701/36 |
| 2001/0027365 A1 | * | 10/2001 | Tode et al. ................... | 701/49 |
| 2001/0039469 A1 | * | 11/2001 | Nishimura .................... | 701/49 |
| 2003/0045984 A1 | * | 3/2003 | Horii et al. ................... | 701/49 |
| 2003/0114974 A1 | * | 6/2003 | Smith et al. .................. | 701/49 |

FOREIGN PATENT DOCUMENTS

GB   2-355-869   5/2001

* cited by examiner

Primary Examiner—Thomas G. Black
Assistant Examiner—Brian J Broadhead
(74) Attorney, Agent, or Firm—Sughrue Mion, PLLC (57) ABSTRACT

It is an object to reliably decide the running area of a vehicle and to carry out suitable irradiation control for the area. This invention provides a lighting device 1 for a vehicle including irradiation control means 5 for deciding a running area based on position information obtained by vehicle current-position detecting means 2 and road information obtained by road information acquiring means 3 and for carrying out irradiation control of a lighting tool for a vehicle according to a result of the decision. For road information, a current running area (a high-speed running area, an urban area) is decided based on information in the current position of a vehicle and information about a road over which the vehicle has already run or the same information and information about the forward place of the vehicle.

6 Claims, 5 Drawing Sheets

LIGHTING DEVICE FOR VEHICLE

FIELD OF THE INVENTION

The present invention relates to a technique for controlling the illumination of a lighting tool corresponding to an area in which a vehicle is running.

DESCRIPTION OF THE RELATED ART

Referring to the light distribution control of a headlamp for a vehicle, there has been proposed an environment compatible lighting device of a light distribution control type which collects information obtained from a navigation device, an image pick-up device and a sensor for detecting an ambient illuminance to decide a running area and changes the irradiating direction, irradiation range and brightness (luminous intensity) of a lighting tool in accordance with a suitable light distribution for the running area.

Examples of the sectional configuration of a running area include a high-speed running area, an urban area and a mountain area. For example, in the case in which it is decided that the running area of a vehicle is the high-speed running area based on information acquired from a navigation device, it is possible to enhance a visibility in a distant place by the irradiation of a main beam (a so-called high beam). Moreover, in the case in which it is decided that the running area of the vehicle is the urban area, a light distribution is controlled such that sufficient illuminated light is obtained in a short distance area, a middle distance area and the shoulder of a road in the forward place of the vehicle. Alternatively, in the case in which it is decided that the running area is the mountain road, an irradiating direction is controlled to be adapted to the bending direction of the road. Thus, various irradiation control operations can be implemented corresponding to a running environment. Consequently, it is possible to obtain an advantage that a proper field of view can be guaranteed for a driver.

However, a conventional device has a problem in precision in decision. As a result, if the running area of a vehicle is erroneously decided, irradiation control, which is not adapted to actual circumstances, is carried out so that a road user is influenced.

Referring to an irradiation beam for a high-speed running area, for example, importance is generally attached to a distant irradiation performance. Therefore, there is a possibility that a dazzlement might be given to a road user (for example, a driver in a vehicle running ahead) when the beam is irradiated in an improper situation.

In the decision of an urban area or a suburban area, moreover, in the case in which information acquired within a predetermined distance ahead of the vehicle (or a distance obtained by multiplying a current vehicle speed by a predetermined running time) is utilized, for example, the running area is decided from road information within a range anticipated from the current position of the vehicle. Accordingly, there is no problem while the vehicle runs as anticipated. In the case in which the vehicle advances over a road which cannot be anticipated, improper beam irradiation is carried out when the result of the decision of the running area is different from an actual running area. For example, although an irradiation beam for running in an urban area is to be selected, another beam irradiation is carried out so that more glare might be given to a road user (for example, a driver in a car running in the opposite direction).

Therefore, it is an object of the invention to reliably decide the running area of a vehicle and to carry out suitable irradiation control for the same area.

SUMMARY OF THE INVENTION

In order to solve the problems, the invention provides a lighting device for a vehicle comprising irradiation control means for deciding a running area based on position information obtained by vehicle current-position detecting means and road information obtained by road information acquiring means, thereby carrying out irradiation control of a lighting tool for a vehicle, wherein a type of a running area in which a vehicle is running is decided from the position information and the road information based on road information in a current position of the vehicle and road information about a road over which the vehicle has already run.

According to the invention, therefore, it is possible to reliably decide a running area based on the road information about the current position and the information about the road over which the vehicle has already run. Consequently, it is possible to prevent improper irradiation from being carried out in the running area.

In the figures, the reference numeral 1 refers to a lighting device for vehicle; 2 to current position detecting means; 3 to road information acquiring means; and 5 to irradiation control means.

DETAILED DESCRIPTION OF THE PREFERRED EMBODIMENTS

Figure 1:
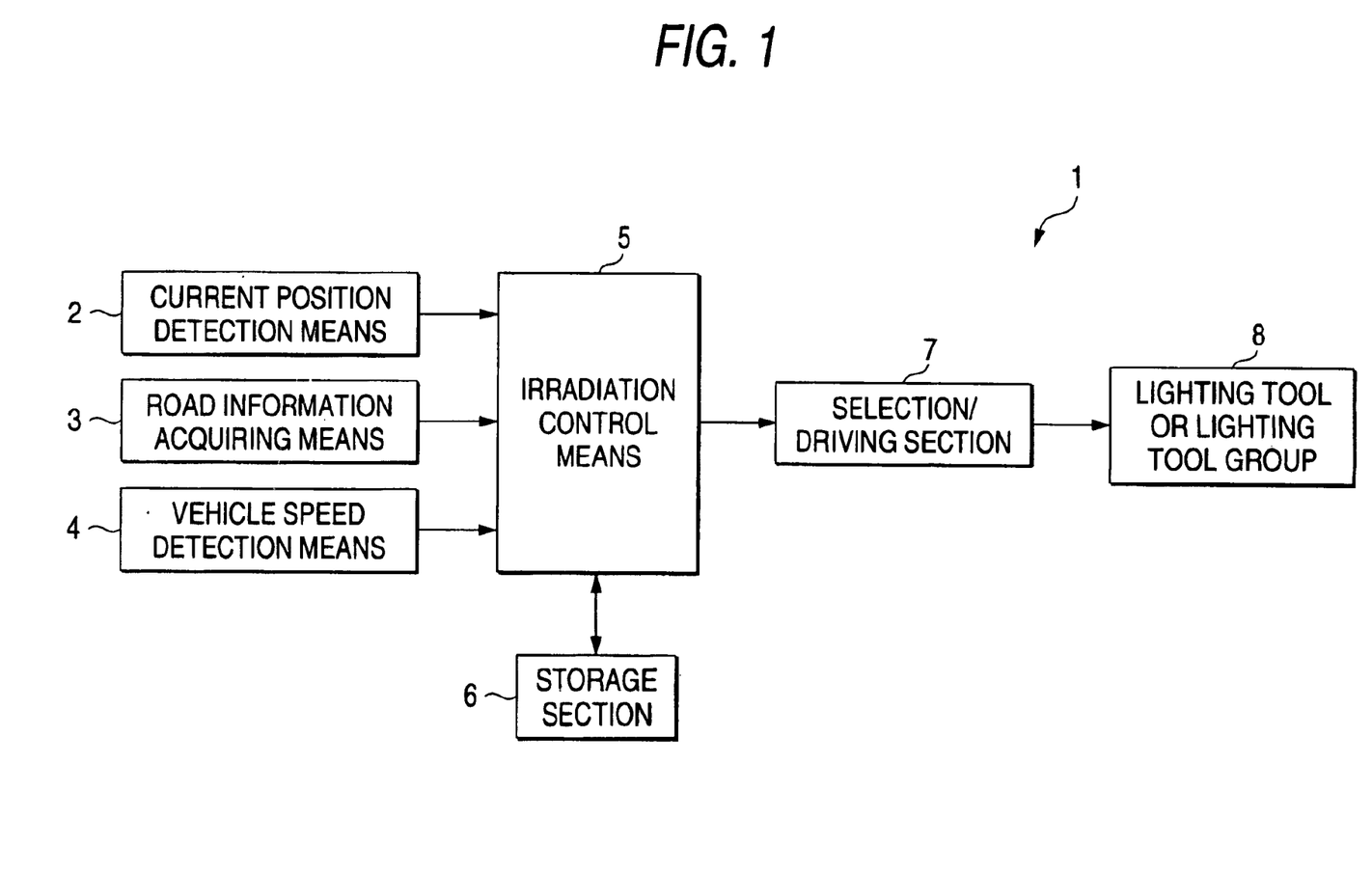
FIG. 1 is a diagram showing a basic structure according to the invention.

FIG. 1 shows a basic structure according to the invention, in which a lighting device 1 for a vehicle comprises the following components (the numerals in parentheses denote signs).

Vehicle current-position detecting means (2)

Road information acquiring means (3)

Vehicle speed detecting means (4)

Irradiation control means (5)

Storage section (6)

Selecting/driving section (7)

Lighting tool or lighting tool group (8).

The current position detecting means 2 is provided to obtain the current position information of a vehicle and is a GPS (Global Positioning System) or a navigation device utilizing a vehicle roadside communication, for example. The acquired position information is transmitted to the irradiation control means 5.

The road information acquiring means 3 is provided to obtain information about a road over the vehicle runs (for example, the number of intersections, a road type and road linear data) and the acquired road information is transmitted to the irradiation control means 5.

The irradiation control means 5 serves to decide a running area based on the current position information and road information about a vehicle, thereby controlling the irradiation of a lighting tool for a vehicle. More specifically, road information in the current position of a vehicle is acquired from the current position information and the road information, and road information about a road over which the vehicle has already run is stored in the storage section 6. Therefore, it is possible to decide the type of a running area over which the car is running by referring to the necessary information in the storage section 6. For example, it is possible to read road information in the past from the storage section 6 on the basis of the current position of the vehicle. Consequently, it is possible to refer to road information within the past distance range or time range. Examples of the distance range and the time range include a static configuration in which they are set to have predetermined constant values and a dynamic configuration in which a set value is properly changed depending on a running state such as a vehicle speed, the state of a road or a running environment.

In any case, a running area is decided based on the current and past road information about a vehicle. Therefore, road information about a forward place which is anticipated from the current position of the vehicle (future information) is not directly related to the decision. It is also possible to refer to information about the forward place of the vehicle (for example, road information or area information which is acquired within a predetermined distance from the current position of the vehicle or a running distance obtained by multiplying a current vehicle speed by a predetermined time). Strictly, the same information can be utilized as reference information, and priority is given to a decision based on the current and past information.

Referring to the section of the running area, various configurations can be proposed. Since the details have no limit, description will be given to the case in which the running area is roughly divided into the following four parts, for example.

(i) High-speed running area (ii) Urban area (iii) Mountain area and curved road (iv) Other areas.

First of all, the "(i) High-speed running area" includes the following roads (double lane roads), for example.

Highway (the Tomei Expressway and the Metropolitan Expressway)

Main national road having a median strip (National Road No. 1)

Main principal road having a median strip (bypass).

Description will be given to an area dividing method in this case. For example, road information is obtained after map matching on the basis of a node for road map creation (a description point such as the number of intersections or road linear data) and link information about the node (the number of roads connected to the node and a direction). Therefore, a decision can be made comparatively easily by acquiring data of a road type (classification).

The highway includes a road which is being fixed and has two lanes (no median strip) and high-speed running cannot be always guaranteed over the highway. For example, it is necessary to consider running in a traffic jam or a temporary stop at a tollhouse. In consideration of the satisfaction of the following conditions, it is preferable that the running area should be decided to be a high-speed running area, thereby carrying out the irradiation control of a beam which is suitable for distant irradiation.

(A) Acquisition of at least information indicative of a double lane road as road information or acquisition of information indicative of a highway having two lanes on either side (four lanes on both sides), and (B) Confirmation of the running speed of a vehicle which is equal to or higher than a reference value in response to a detection signal sent from the vehicle speed detecting means 4.

(C) Decision of no branch path such as an intersection within a predetermined range in the forward place of the vehicle.

Consequently, it is possible to prevent a bad effect (a dazzlement) from being given to a road user. The "double lane road" indicates an up line and a down line as separate roads on a road map DB (a data base), for example, and includes a main highway (the Tomei Expressway) and a main national road (the National Road No. 1).

Referring to the (C), for example, it is confirmed that there is no branch point such as an intersection within a predetermined distance range (a distance section of 300 m or less in the forward place of a vehicle) or a running distance range obtained by multiplying a current speed by a predetermined time, thereby deciding a high-speed running area. Thus, a reliability can be more increased.

Referring to the decision of "(ii) Urban area", next, it is hard to make a direct decision based on road information and it is possible to make a decision based on the numbers of intersections and traffic signals in a path over which the vehicle has already run and a current position, for example. More specifically, noting the fact that more intersections and signals can be generally seen on a road in an urban area, the decision can be made based on the number of the links of a node. Referring to a path over which the vehicle has already run, for example, the number of the links of a node is summed or the mean value of the number of the links (a simple mean value, a moving mean value and a weighted mean value) is calculated from the road information in the current position and the road information in the storage section 6. The number thus obtained is compared with a predetermined decision threshold. If the value is greater than the threshold, it is preferably decided that the vehicle is running in the urban area. If not so, it is preferably decided that the vehicle is running in an area other than the urban area. Moreover, it is also possible to decide whether or not the vehicle is running in the urban area by calculating the number of places in which the number of the links of the node exceeds a predetermined threshold within a predetermined distance range (or a running time), a distribution thereof and the tendency of increase or decrease (for example, the amount of increase or decrease in the number of links per running time or running distance).

In short, if it is possible to decide whether or not the type of a running area is an "urban area" from the number of the links of the node in the current and past running paths of the vehicle or a mean value thereof, or the tendency of increase or decrease based on the same number, any method can be used.

Moreover, it is possible to employ a method of deciding a running area by utilizing a road map data base having a land mark added thereto. It is possible to divide whether the node is positioned in an urban zone or a midtown.

In addition, in a vehicle roadside communication compatible navigation device, landmark information is transmitted from a road side transmitter (a so-called beacon) toward the vehicle so that it is possible to directly know any area to which a node positioned on the course of the vehicle belongs.

Referring to the "(iii) Mountain area and curved road", there have been known various methods of deciding a curved road having a continuous S-shaped curve or a road having a continuous crank (for example, a method of making a decision based on the calculation of a direction vector connecting nodes and a method of deciding a radius of curvature or a bending point position by analyzing image information obtained by image pick-up means such as a CCD camera). In this case, the past road information can be utilized for deciding a running area but is useless for control related to a forward irradiating direction. Therefore, it is necessary to acquire road information in the direction of advance of the vehicle. Moreover, it is preferable to practically use detection information obtained by a steering angle sensor or a yaw rate sensor.

Figure 2:
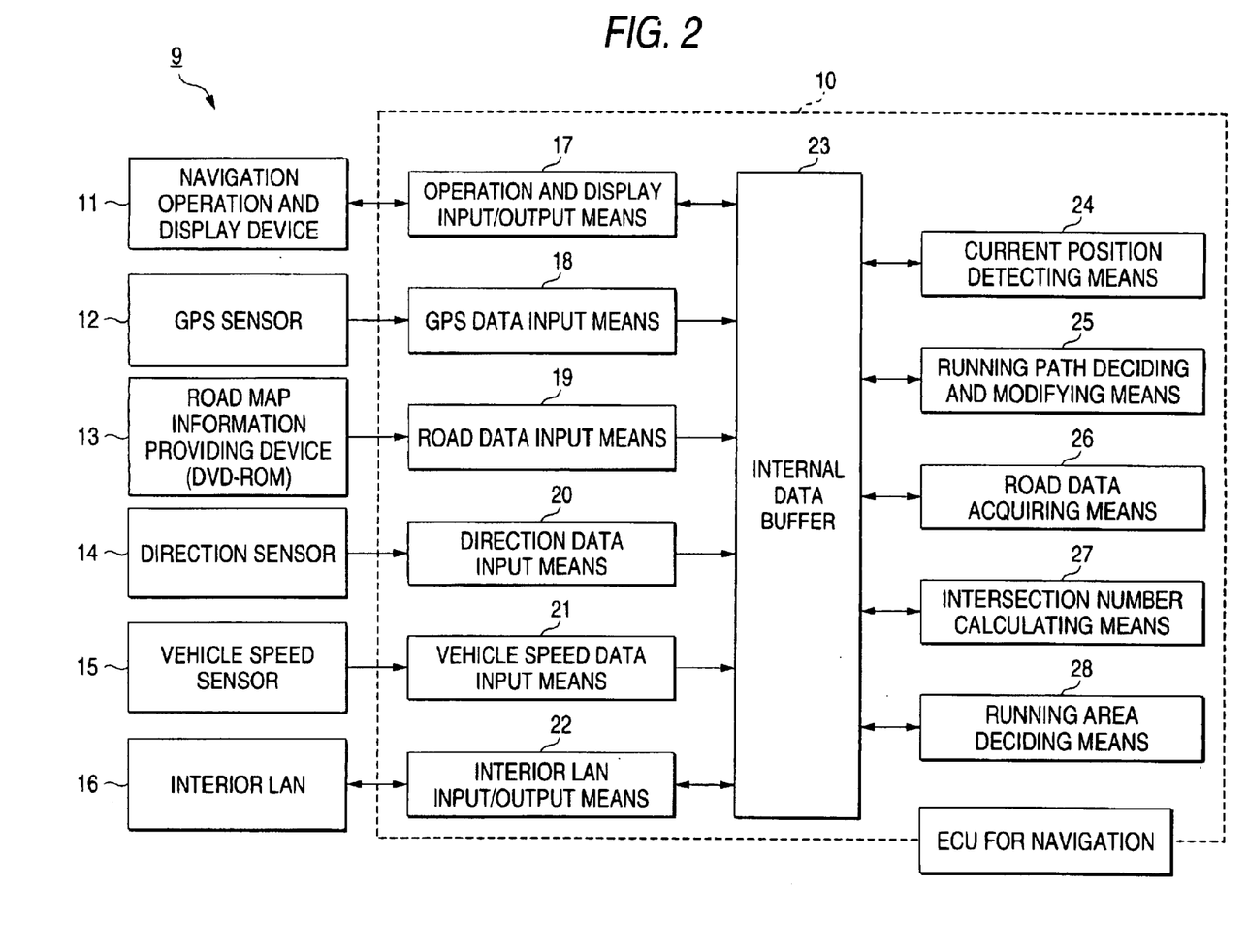
FIG. 2 is a diagram showing an example of the structures of main parts.

FIG. 2 shows the main part of a structure example 9 in the case in which an ECU (electronic control unit) including a computer is used as the irradiation control means 5, in which a navigation system utilizing a GPS is used. Referring to a processing in an ECU 10 for navigation which is shown, actually, a software processing using a CPU (central processing unit) and a memory is carried out. The same processing is represented as a functional block element (processing means) in the drawing.

Examples of the external device of the ECU 10 are as follows (the numerals in parentheses indicate signs).

Navigation operation and display device (11)

GPS sensor (12)

Road map information providing device (13)

Direction sensor (14)

Vehicle speed sensor (15)

Interior local area network (16).

On the other hand, input means and input/output means which are provided in the ECU 10 are external interfaces, respectively, and a two-way communication can be carried out between operation and display input/output means 17 and interior LAN (local area network) input/output means 22, and others, that is, GPS data input means 18, road data input means 19, direction data input means 20 and vehicle speed data input means 21 carry out a one-way transmission to the ECU 10.

The navigation operation and display device 11 serves to carry out an operation for setting and retrieving a path and image display for inducing a path, and exchanges information together with the ECU 10 through the operation and display input/output means 17.

Moreover, the detection information of the GPS sensor 12 is acquired in the ECU 10 through the GPS data input means 18 and the detection information of the direction sensor 14 is acquired in the ECU 10 through the direction data input means 20.

The road map information providing device 13 comprises an information recording medium such as a DVD-ROM or a CD-ROM and a driving device thereof, and the information provided by the device is utilized in the ECU 10 through the road data input means 19.

The detection information of the vehicle speed sensor 15 is acquired in the ECU 10 through the vehicle speed data input means 21 and is utilized for the detection of a vehicle state including an acceleration and an additional acceleration in addition to the running speed of a vehicle.

The interior LAN 16 is constructed to carry out a communication between a device provided in addition to the ECU 10 and various ECUs (for example, an ECU for air suspension control and an ECU for lamp irradiation control).

The input means and input/output means provide data to the following various processing means (the numerals in parentheses denote signs) through an internal data buffer 23 or acquire necessary data from the same processing means.

Current position detecting means (24)

Running path deciding and modifying means (25)

Road data acquiring means (26)

Intersection number calculating means (27)

Running area deciding means (28).

First of all, the current position detecting means 24 serves to collect the position information about a plurality of GPS satellites to detect the current position of a vehicle in a GPS coordinate system by the GPS sensor 12 and to store the current position. In other words, the position information includes a latitude and a longitude, and date information.

The running path deciding and modifying means 25 serves to carry out a map matching process based on the current position on the GPS coordinates, road map data and direction data and to determine a road (a running path) over which a vehicle is running and a direction of a course thereof, and to obtain and store the current position of the vehicle on a running path. In the case of a path modifying process, moreover, if it is clear that a road is present in parallel with a running path and a path is selected erroneously, for example, a past running path is modified and the result of the modification is stored to update the data.

The road data acquiring means 26 serves to acquire and store the type of the road of a running path, the number of intersections and road linear data as the information about a node if the current position on the running path is placed on the node, for example.

The intersection number calculating means 27 calculates and stores the number of intersections within a predetermined section (for example, a constant distance section or a running period) for the stored or modified running path. The number of intersections is mainly utilized for deciding an urban area.

The running area deciding means 28 serves to decide a running area based on the stored information obtained by the running path deciding and modifying means 25, the road data acquiring means 26 and the intersection number calculating means 27. The detection information of the vehicle speed sensor 15 is also utilized for deciding a high-speed running area. As described above, setting is carried out such that a beam for a high-speed running area is irradiated if the running speed of a vehicle is equal to or higher than a predetermined value and that the same beam is not selected if the running speed is lower than the predetermined value. The result of the decision of the running area deciding means 28 is transmitted from the interior LAN input/output means 22 to an ECU for lamp irradiation which is not shown through the interior LAN 16. The ECU receives data on the result of the decision, thereby carrying out the light distribution control and beam selection corresponding to a running area which is decided.

In the change of the running area, it is preferable that the previous results of the decision should be stored and compared with a present result of the decision. As a result of the comparison, in the case in which the area is changed or set into a new running area, it is desirable that an irradiation state before the change is gradually varied by the irradiation control means, thereby carrying out a transition to the irradiation state after the change. In other words, the light distribution and the beam are varied when the running area is changed. When the irradiation state is suddenly changed at time of the switching of the running area, a driver and a road user are influenced greatly. In the case in which a transition from a certain running area to a next running area is carried out, therefore, it is preferable that a light distribution, a brightness, a beam irradiating direction or an irradiation range should be changed gradually and a transition period therefor should be provided. In that case, there are a configuration in which a new irradiation state is set through a stepwise change and a configuration in which a new irradiation state is set through a continuous change. The latter transition can be carried out more smoothly. For example, there is a method of gradually increasing a brightness through an extinction state to approximate to a specified light amount without immediately turning on a light source when the light control of a light source is to be carried out for the amount of irradiated light of a lighting tool. In the case of a lighting tool having the function of changing the irradiating direction of a beam by the optical axis control of the lighting tool (for example, a lighting tool comprising a mechanism for changing the tilt attitude of a reflecting mirror by an actuator), moreover, the control is carried out such that a direction is continuously changed from an irradiating direction before a change and an irradiating direction after the change is obtained.

While the running area deciding means 28 is provided in the ECU 10 for navigation in the example of FIG. 2, it may be provided in an ECU for lamp irradiation. In this case, necessary data for a running area decision are to be received by the ECU for lamp irradiation after they are transmitted from the interior LAN input/output means 22 through the interior LAN 16. Moreover, while the irradiation control means 5 is constituted by two ECUs in the example, both of them may be collected into one ECU.

In FIG. 1, the irradiation range, direction, light amount and light distribution of a lighting tool are finally controlled in response to a control signal sent from the irradiation control means 5 to a selecting/driving section 7. More specifically, the selecting/driving section 7 includes all components required for a driving operation for beam selection (or light source selection), light control (containing extinction) and optical axis control and a driving operation of an optical member for light distribution control.

A beam to be used corresponding to the running areas (i) to (iv) will be described briefly. First of all, a beam for a high speed running area to be used for the case of (i) serves to enhance an illumination performance in a distant place such that a vehicle can safely run at a high speed over a highway having an anti-glare fence and a median strip.

Referring to a beam for running in the urban area which is to be used in the case of (ii), moreover, diffusion illumination toward a side is to be basically carried out widely in order to safely run over a road in the suburbs of an urban area having many crossing pedestrians or at an intersection.

In the case of (iii), importance is attached to illumination in short and middle distance areas and the shoulder of a road and control in an irradiating direction taking the advance of a vehicle in advance is carried out to adapt to slalom running.

A beam to be used in the case of (iv) includes a light distribution of a low beam or a suitable light distribution for running in a suburban road (a quiet road in which a gentle curve is present) based thereon.

Various manners including a multiple light type, a beam movable type and a light distribution control type have been known as the configuration of a lighting tool, various embodiments corresponding to the components (a light source, a reflecting mirror, a lens member and a shade) of a lighting tool have been known for the control of an irradiation range and direction, and a single configuration or a combined configuration may be used for the invention. Therefore, detailed description will be omitted.

Figure 3:
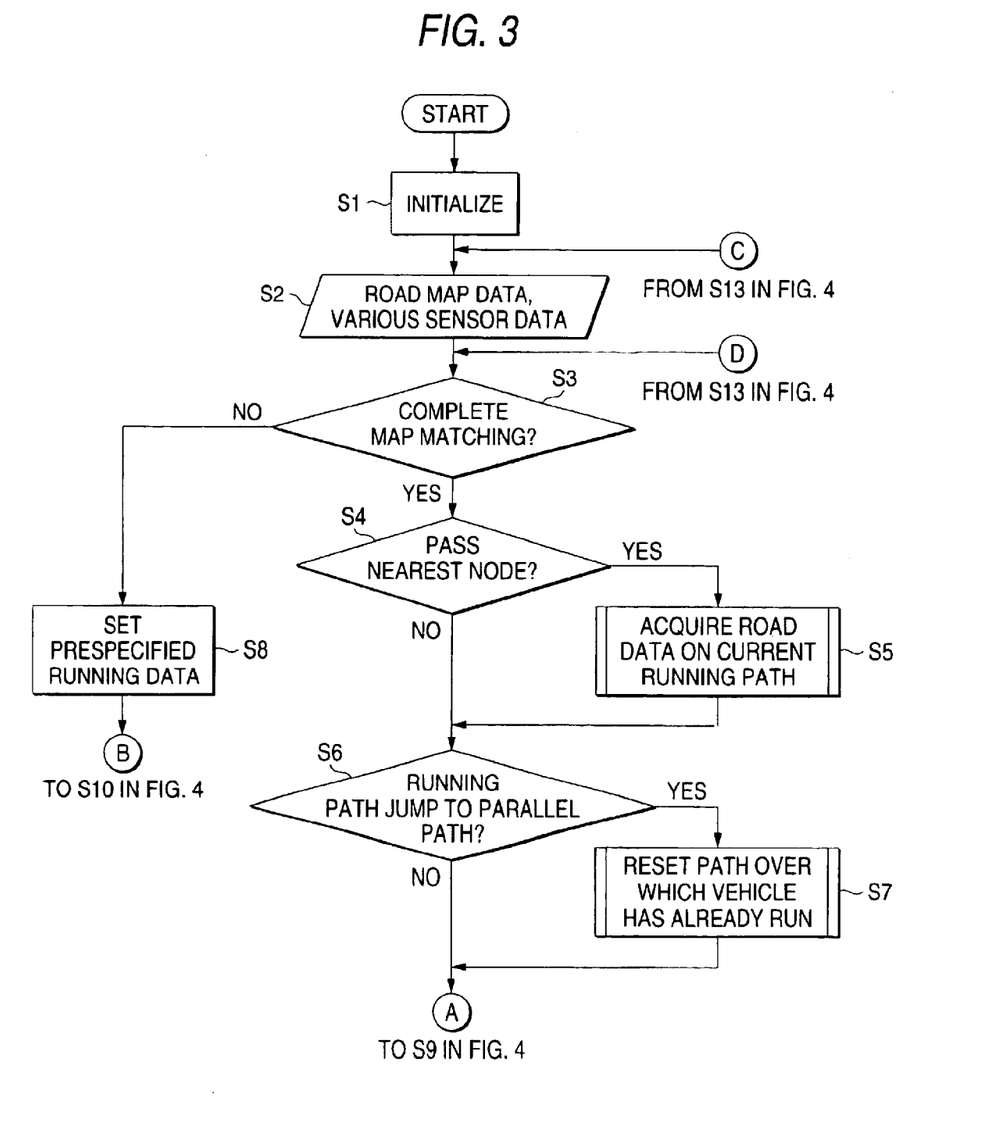
FIG. 3 is a flow chart showing an example of control together with FIG. 4, illustrating the first half part of a processing.
Figure 4:
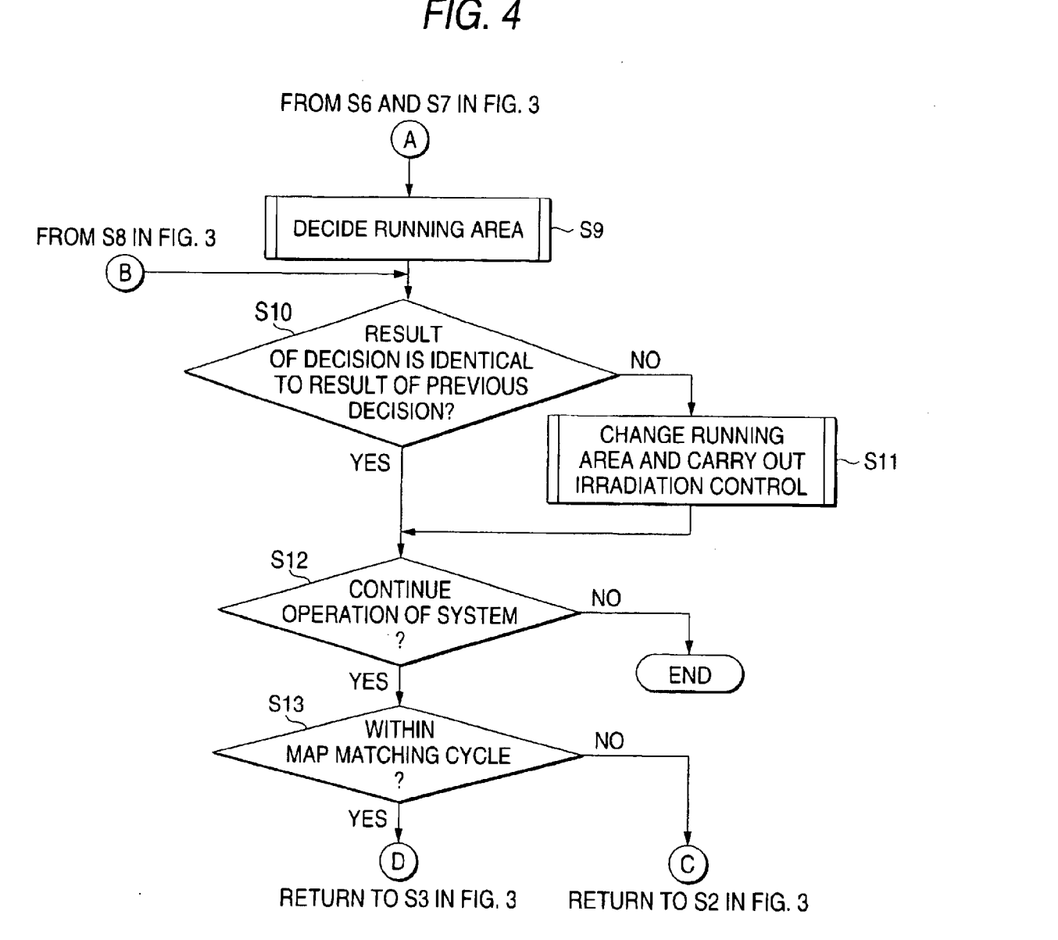
FIG. 4 is a flow chart showing the second half part of the processing.

FIGS. 3 and 4 are flow charts showing an example of the irradiation control, assuming the structure of the ECU 10 for navigation illustrated in FIG. 2.

A processing is started by turning on a system power source, and initialization is first carried out at a step S1 in FIG. 3. For example, a beam (a so-called default beam) to be in an initial state is set (to a low beam) such that beam irradiation which cannot be anticipated is not first carried out. Moreover, origin positioning is performed for a driving mechanism in the case in which the optical axis control of a lighting tool is to be carried out.

At a step S2, next, road map data, GPS data, direction data and vehicle speed data are acquired. While road map data provided from a DVD-ROM are acquired if necessary, other data are acquired in a predetermined sampling cycle.

At a step S3, then, it is decided whether or not map matching is completed. At time of the completion, the processing proceeds to a step S4. If not so, the processing proceeds to a step S8.

At the step S4, it is decided whether or not the current position of a vehicle has passed the nearest node. If the nearest node has been passed, the processing proceeds to a step S5. If the nearest node has not been passed, the processing proceeds to a step S6.

At the step S5, road data (for example, a road type, a double lane road, the number of lanes and the number of intersections) are acquired for a current running path. Then, the processing proceeds to the step S6.

At the step S6, it is decided whether or not the running path jumps to a parallel path (a state transition). The decision is carried out in order to modify a difference between the road following route of a vehicle and an actual selected route. If the running path jumps to the parallel path, the processing proceeds to a step S7 in which the path is modified. In other words, a path over which the vehicle has already run is modified or reset and road data on the modified path are reconsidered to decide whether or not the distinction of a running area is influenced (if the distinction is influenced by the update of the road data, the result of the decision in the running area is to be changed).

Subsequently, the processing proceeds from the step S6 (in the case of "No") or the step S7 to a step S9 of FIG. 4 (see "A") in which the running area is distinguished. For example, the running area is decided to be a high-speed running area in the case in which a vehicle speed is equal to or higher than the legal speed of a road over which the vehicle is running (50 km/h or more is set in consideration of an error or a fluctuation in the switching of the decision when the legal speed is 60 km/h) and the vehicle is running over the double lane road or the case in which the vehicle is running over a double lane road having no branch path such as an intersection within a forward place of 300 m or less therefrom, or the running area is decided to be an urban area in the case in which the number of intersections or signals in a predetermined section is equal to or greater than a threshold. Then, the processing proceeds to a step S10.

If the map matching has not been completed at the step S3, the processing reaches a step S8 in FIG. 3. In that case, the road data cannot be utilized. Therefore, the running area is not decided but set to a predetermined running area (a default running area). For example, the "(iv) other areas" is set. Thereafter, the processing proceeds to the step S10 in FIG. 4 (see "B").

At the Step S10, the result of the present decision is compared with that of the last decision. If both of them are identical to each other, the processing proceeds to a step S12. If both of them are different from each other, the processing proceeds to a step S11.

At the step S11, the running area is changed. Control for a smooth transition is carried out such that an irradiation state is not varied suddenly by the change. For example, it is preferable that continuous control should be carried out for the irradiating direction and light amount of a beam for a transition period as described above. The light distribution, the irradiation state and the light amount are controlled by driving control or light control which is related to an optical element such as a reflecting mirror or by selecting a lamp to be turned on or a beam. After the transition period, a suitable irradiation state for the running area thus changed is brought.

The processing proceeds to the step S12 in which it is decided whether the operation of a system is continuously carried out or is stopped. If the operation is continuously carried out, the step proceeds to a step S13. If the operation is stopped, the processing is ended.

At the step S13, it is decided whether or not the present time ranges in a map matching cycle. In other words, the map matching process is carried out in a constant cycle. Therefore, if the present time ranges in the same cycle, the processing returns to the step S3 in FIG. 3 (see "D"). If the present time ranges beyond the cycle (that is, a next cycle), the processing returns to the step S2 in FIG. 3 in order to acquire new data (see "C").

Referring to the steps S10 and S11, if the result of the decision in the running area is different from the previous result, the running area is changed by setting the number of differences to be one. Furthermore, it is a matter of course that various embodiments can be carried out, for example, a more reliable decision is made by confirming that the number of differences reaches a predetermined number of times to change the running area.

Figure 5:
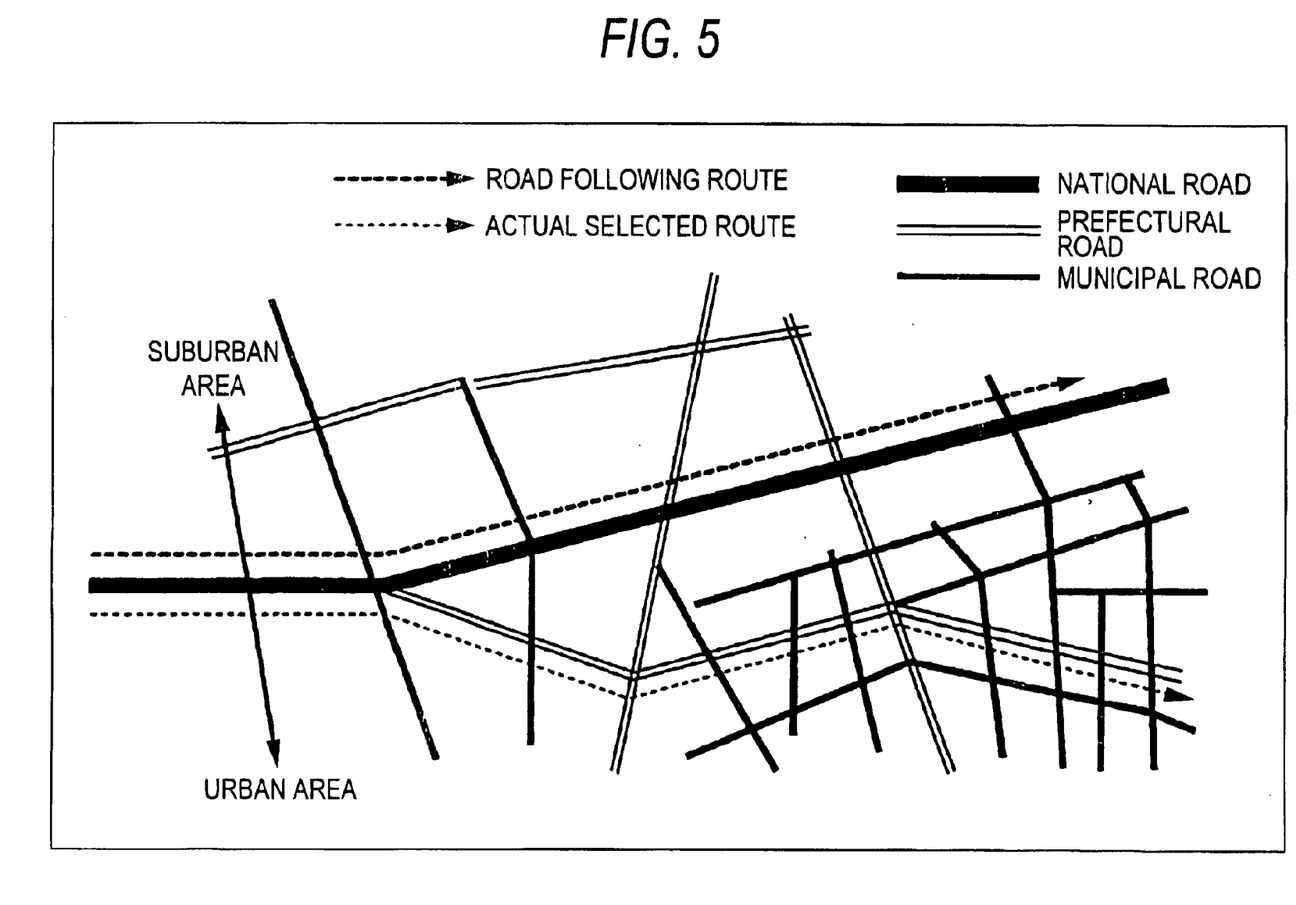
FIG. 5 is a view for explaining a bad effect produced by a difference between a road following route and an actual selected rout.

FIG. 5 is a view for explaining an advantage obtained by using the lighting device for a vehicle described above. In the example, a suburban area and an urban area are present to interpose a national road shown in a thick line therebetween, and a prefectural road which is provided in almost parallel with the national road branches to be Y-shaped paths in the urban area.

Under these circumstances, in a conventional device, there is a possibility that improper irradiation control might be carried out in the case in which a vehicle advancing path is predicted erroneously so that a road following route (national road) for a vehicle is decided to be a running path and is different from an actual selected route (prefectural road). For example, it is proper that the area should be decided to be an urban area based on the number of intersections or traffic signals. As a result of the erroneous decision that the area is a suburban area, however, appropriate beam selection is not carried out, resulting in a bad effect (for example, glare given to a driver in a car running in the opposite direction).

In the invention, a running area can be decided based on data on a path over which a vehicle has already run. Therefore, it is possible to previously avoid the generation of such a bad effect or to deal with the bad effect by a rapid modification.

Thus, it is apparent that the following advantages can be obtained from the above description.

In the decision of a running area, data related to a path over which a vehicle has already run are utilized. Therefore, there is a low possibility that the running area might be recognized erroneously.

Referring to a high-speed running area, a double lane road, a vehicle speed value and the presence of a branch path are set to be criteria. Therefore, it is possible to make a decision more strictly.

In the case in which a vehicle speed is equal to or smaller than a predetermined reference value, beam irradiation having less glare is carried out. In a traffic jam over a highway, therefore, it is possible to prevent a road user from suffering from glare.

As is apparent from the above description, according to the first aspect of the invention, it is possible to reliably decide the running area based on the road information of the current position and the information about the road over which the vehicle has already run. Therefore, it is possible to prevent irradiation control which is not adapted to the actual circumstances based on the result of an erroneous decision and to inhibit a road user from being adversely affected.

According to the second aspect of the invention, it is possible to enhance accuracy by confirming the result of the decision with reference to the road information in the forward place of the vehicle.

According to the third and fourth aspects of the invention, it is possible to accurately make a decision in the high-speed running area. Therefore, it is possible to prevent glare from being given to a road user.

According to the fifth aspect of the invention, the transition control is carried out such that the irradiation state is not changed suddenly at time of the change of the running area. Consequently, it is possible to relieve the influence on a driver and a road user.

What is claimed is:

1. A lighting device for a vehicle comprising:
   vehicle current-position detecting means for obtaining position information;
   road information acquiring means for obtaining road information; and
   irradiation control means for deciding a running area based on the position information obtained by vehicle current-position detecting means and the road information obtained by road information acquiring means and carrying out irradiation control of a lighting tool for a vehicle based on the decided running area;
   wherein the irradiation control means decide a type of a running area, in which a vehicle is running, from the position information and the road information based on road information in a current position of the vehicle and road information about a road over which the vehicle has already run, and
   wherein, in a case in which results of previous decisions related to a running area are stored and are compared with a result of a present decision to change the running area, the irradiation control means gradually vary an irradiation state from an irradiation state before the change to an irradiation state after the change.

2. The lighting device for a vehicle according to claim 1, wherein the irradiation control means decide a type of a running area, over which a vehicle is running, by referring to road information in a forward place of the vehicle.

3. The lighting device for a vehicle according to claim 1, wherein, if at least road information indicative of a double lane road is acquired and a running speed of the vehicle is equal to or higher than a reference value, the irradiation control means decide a running area to be a high-speed running area and carry out irradiation control for distant illumination mainly.

4. The lighting device for a vehicle according to claim 2, wherein, if at least road information indicative of a double lane road is acquired and a running speed of the vehicle is equal to or higher than a reference value, the irradiation control means decide a running area to be a high-speed running area and carry out irradiation control for distant illumination mainly.

5. The lighting device for a vehicle according to claim 1, wherein if at least road information indicative of a double lane road is acquired and a branch path is not present within a predetermined distance over a running path in a forward place of the vehicle, the irradiation control means decide a running area to be a high-speed running area and carry out irradiation control for distant illumination mainly.

6. The lighting device for a vehicle according to claim 2, wherein if at least road information indicative of a double lane road is acquired and a branch path is not present within a predetermined distance over a running path in a forward place of the vehicle, the irradiation control means decide a running area to be a high-speed running area and carry out irradiation control for distant illumination mainly.

* * * * *